(12) United States Patent
Kubo et al.

(10) Patent No.: US 7,443,503 B2
(45) Date of Patent: Oct. 28, 2008

(54) POLARIZATION MEASURING APPARATUS

(75) Inventors: Teruhiro Kubo, Yokohama (JP); Yoichi Oikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/843,389

(22) Filed: May 12, 2004

(65) Prior Publication Data
US 2005/0094143 A1 May 5, 2005

(30) Foreign Application Priority Data
Nov. 5, 2003 (JP) .............................. 2003-375749

(51) Int. Cl.
*G01J 4/00* (2006.01)
(52) U.S. Cl. .................................... 356/364
(58) Field of Classification Search ......... 356/364–368; 250/225
See application file for complete search history.

(56) References Cited

U.S. PATENT DOCUMENTS

| | | | | |
|---|---|---|---|---|
| 3,214,596 | A * | 10/1965 | Schwerdt, Jr. et al. | 250/239 |
| 3,937,577 | A * | 2/1976 | Dorsch | 356/312 |
| 5,341,214 | A * | 8/1994 | Wong | 356/437 |
| 5,550,675 | A | 8/1996 | Komatsu | |
| 5,965,874 | A * | 10/1999 | Aso et al. | 250/225 |
| 6,177,995 | B1 * | 1/2001 | Compain et al. | 356/366 |
| 6,384,916 | B1 * | 5/2002 | Furtak | 356/369 |
| 6,738,141 | B1 * | 5/2004 | Thirstrup | 356/445 |
| 6,891,616 | B2 * | 5/2005 | Saitoh et al. | 356/368 |

FOREIGN PATENT DOCUMENTS

| | | |
|---|---|---|
| JP | 59-217124 | 12/1984 |
| JP | 06-018332 | 1/1994 |
| JP | 6-34444 | 2/1994 |
| JP | 7-94761 | 4/1995 |
| JP | 09-072827 | 3/1997 |
| JP | 2001-520754 | 10/2001 |
| JP | 2003-508772 | 4/2003 |

OTHER PUBLICATIONS

Japanese Patent Office Action, mailed May 13, 2008 and issued in corresponding Japanese Patent Application NO. 2003-375749.

* cited by examiner

*Primary Examiner*—Tarifur R. Chowdhury
*Assistant Examiner*—Isiaka O Akanbi
(74) *Attorney, Agent, or Firm*—Staas & Halsey LLP

(57) ABSTRACT

The invention aims to provide a miniaturized polarization measuring apparatus which can measure the polarization of input signal light with high accuracy, even in an optical system where a plurality of light receiving elements are arranged adjacent to each other. To this end, in the polarization measuring apparatus which branches the input signal light into four signal lights by optical couplers in a three stage configuration, and provides the signal lights with polarizations and the phase shifts, which are different for each signal light, by a plurality of optical elements arranged on branched optical paths, and detects the signal light powers by corresponding light receiving elements, and calculates the Stokes parameters or the like, based on the detection results, to thereby measure the polarization of the input signal light, the elements are arranged to be inclined to each other, so that an interference system is not formed between the adjacent elements on the same branched optical path, and also there is provided a shielding wall so that a stray light generated between these elements does not reach the light receiving element on another branched optical path.

14 Claims, 8 Drawing Sheets

(A)

(B)

POLARIZATION MEASURING APPARATUS

BACKGROUND OF THE INVENTION

1. Field of the Invention

The present invention relates to a polarization measuring apparatus for detecting the polarization of input signal light by measurement of the Stokes parameter or the like.

2. Description of the Related Art

In optical communication systems, as one means for increasing the transmission capacity, it is considered that a communication speed per one channel is increased. However, if the bit rate of a signal light reaches a range exceeding 10 Gbps (giga bit/second) or 40 Gbps, the pulse width of the signal light becomes several tens of ps (picosecond). Therefore, it becomes difficult to distinguish between a '0' level and a '1' level of the respective bits due to the waveform distortion caused by various factors. Since such waveform distortion becomes a factor in determining the main specifications such as system length, then when designing a system, various measures, such as arranging parts for compensating for the waveform distortion, are taken.

As a factor causing the waveform distortion of the signal light, there is polarization mode dispersion (PMD). This PMD is the dispersion which arises as a result of an occurrence of differential group delay (DGD) between two orthogonal polarization modes, due to, for example, the deformation of a core of an optical fiber to be used as an optical transmission path into an elliptic shape, a lateral pressure, a partial temperature change and the like. For example, in the case where an optical fiber is laid in a place, which is subjected to vibration or the like, along the side of a railroad, a change in the PMD is extremely fast, and a speed of the change is said to be approximately several KHz.

PMD compensators (to be referred to as PMDC hereunder) for compensating for the abovementioned PMD have been recently developed by various companies. A well-known PMDC configuration is basically a loop back system where the waveform distortion of a signal light is monitored and a compensation amount of the PMD is controlled corresponding to the monitoring result. However, according to such a loop back system, it is difficult to directly and quantitatively monitor a state of the waveform distortion and a generated dispersion amount. As substitute means, typically, there is a method for monitoring a degree of polarization (DOP). Moreover, examples of measuring the bit error rate (BER), or measuring the electrical spectrum hole burning are also known.

The DOP can be measured using a polarization measuring apparatus (polarimeter). As a conventional polarizabon measuring apparatus, there is known, for example, an apparatus for measuring four Stokes parameters representing polarization (for example, Japanese Unexamined Patent Publication No. 6-18332, Japanese Unexamined Patent Publication No. 9-72827, Japanese National Publication No. 2001-520754, and Japanese National Publication No. 2003-508772).

FIG. 7 shows a configuration of a basic optical system of the conventional polarization measuring apparatus as mentioned above. In this optical system, firstly an input signal light is branched into four at 25% each, by an optical coupler (CPL) 1. Then, a first branched light passes through a quarter wave plate (QWP) 2 and a polarizer (POL) $3_1$ letting through only a polarization component which is inclined by 45° with respect to a preset reference plane, and is input to a light receiving element (PD) $4_1$. A second branched light passes through a polarizer (POL) $3_2$ letting through only a polarization component which is inclined by 45° with respect to the above reference plane, and is input to a light receiving element (PD) $4_2$. A third branched light passes through a polarizer (POL) $3_3$ letting through only a polarization component which is parallel (or perpendicular) with respect to the above reference plane, and is input to a light receiving element (PD) $4_3$. A fourth branched light is directly input to a light receiving element (PD) $4_4$.

If the electric signals which are photoelectrically converted by the respective light receiving elements $4_1$, $4_2$, $4_3$ and $4_4$, to be output, are $D_Q$, $D_{45}$, $D_0$, and $D_T$, then the four Stokes parameters $S_0$, $S_1$, $S_2$ and $S_3$ are represented by the relationship shown in the following equation (1).

$$S_0 = D_T$$
$$S_1 = 2 \cdot D_0 - D_T$$
$$S_2 = 2 \cdot D_{45} - D_T$$
$$S_3 = 2 \cdot D_Q - D_T \qquad (1)$$

Here, $S_0$ represents the intensity of the input signal light, $S_1$ represents a horizontal linear polarization component (0°), $S_2$ represents a linear polarization component which is inclined by 45°, and $S_3$ represents a right-handed rotatory circular polarizabon component. By using the abovementioned Stokes parameters $S_0$ to $S_3$, the DOP to be measured is represented in accordance with the relationship of the following equation (2).

$$DOP = \frac{\sqrt{S_1^2 + S_2^2 + S_3^2}}{S_0} \qquad (2)$$

However, in the abovementioned conventional polarization measuring apparatus, there are following problems.

(a) Enlargement of the Apparatus Size

In the conventional polarization measuring apparatus, as shown in the optical system in FIG. 7, a large number of optical elements, such as, the optical coupler 1, the quarter wave plate 2, the polarizers $3_1$ to $3_3$, and the light receiving elements $4_1$ to $4_4$ must be arranged in required positions, and hence there is a tendency for the size of the whole apparatus to become large.

(b) Deterioration of Measurement Accuracy Due to Reflected Lights Generated in the Optical Elements Generally, a part of an incident light is reflected at a light incident plane and the like of an optical element, a refractive index of which is changed. In order to suppress the generation of this reflected light, an anti-reflection film is normally formed on the light incident plane of the optical element. However, it is difficult to completely prevent the generation of the reflected light by the ant-reflection film. In the optical system shown in FIG. 7, there is a possibility that reflected lights are generated at the respective light incident planes of the optical coupler 1, the quarter wave plate 2, the polarizers $3_1$ to $3_3$, and the light receiving elements $4_1$ to $4_4$, and also, there are many places which can be reflection surfaces. In the case where some of these reflection surfaces are in a parallel or nearly parallel state with respect to a light emission plane of a former stage optical element, then for example as shown in FIG. 8, the multi-reflection of light occurs and an interference system is formed. Therefore, the power of the signal light detected by the light receiving element is varied with time, and a transmission characteristic has the wavelength dependence, resulting in the deterioration of measurement accuracy. Moreover, there is also a possibility that a part of the light reflected at the light incident and emission planes of the respective optical elements becomes a stray light. In an optical system where parts such as light receiving elements are arranged adjacent to each other in order to miniaturize the apparatus, the above stray light is input to a light receiving element different to a light receiving element to which the stray light is to be input primarily, to cause light leakage (cross-talk), resulting in the deterioration of measurement accuracy.

(c) Deterioration of Measurement Accuracy Due to the Phase Shift between p/s Waves In the conventional polarization measuring apparatus, the input signal light is branched into four by the optical coupler 1, in order to obtain the four Stokes parameters $S_0$ to $S_3$. In the case where one utilizing for example a dielectric multi-layer film is used as the optical coupler 1, it is known that the phase shift occurs between the p wave (p polarized light) and the s wave (s polarized light) of the branched light (specifically, the transmitted light) due to the optical coupler 1. Such phase shift between the p/s waves does not cause a problem in a function of branching the optical power, but does change the polarization of the signal light after passing through the optical coupler 1. Therefore, in the case where there is an optical element such as a polarizer on the latter stage of the optical coupler 1, the phase shift affects the power of the signal light passing through the polarizer or the like, which becomes a factor in the deterioration of measurement accuracy.

(d) Deterioration of Measurement Accuracy Due to Temperature Fluctuation

Since the conventional polarization measuring apparatus comprises a large number of optical elements as shown in FIG. 7, characteristics of the respective optical elements are changed with the temperature fluctuation, which causes the deterioration of measurement accuracy. Moreover, since the input signal light is branched into four, and then transmitted over the respective optical elements, a mounted area becomes large and there is thus the likelihood of influence of optical axis shift due to the temperature fluctuation.

SUMMARY OF THE INVENTION

The present invention has been accomplished in view of the problems as shown in the abovementioned (a) to (d), with an object of providing a miniaturized polarization measuring apparatus which can measure the polarizabon of input signal light with high accuracy, even in an optical system where a plurality of light receiving elements are arranged adjacent to each other.

In order to achieve the abovementioned object, a polarizaton measuring apparatus of the present invention comprises: an optical branching section that branches an input signal light into a plurality of signal lights; a plurality of optical elements arranged on a plurality of branched optical paths through which the signal lights branched by the optical branching section are propagated, respectively, for providing the signal lights with polarizations and phase shifts, which are different for each signal light; and a plurality of light receiving elements receiving the signal lights respectively propagated through the branched optical paths, to detect the powers of the signal lights, wherein, the elements adjacent to each other of the optical elements and the light receiving element arranged on the same branched optical path, are arranged to be inclined to each other so that a light emission plane of the element positioned on a former stage and a light incident plane of the element located on a latter stage are not substantially in parallel, and there is provided a shielding section that prevents a stray light generated by the reflection of the signal light between the elements where the light incident and emission planes are arranged to be inclined to each other, from reaching the light receiving element located on another branched optical paths which is different from the branched optical path concerned.

According to such a configuration, the opposing incident and emission planes of the adjacent elements which exist on the same branched optical path are arranged to be inclined to each other, so as to avoid that an interference system is formed due to the multi-reflection of the reflected light. Also, the stray light generated between the elements arranged with their incident and emission planes inclined to each other, is blocked by the shielding section, to be prevented from being incident on the light receiving element on another branched optical path to be received. Therefore, it becomes possible to stably measure the polarization of the input signal light with extremely high accuracy.

Moreover, as one aspect of the above polarization measuring apparatus, the configuration may be such that the optical branching section branches an input signal light into first to fourth signal lights, and the plurality of optical elements include: a quarter wave plate and a first polarizer letting through only a polarization component which is inclined by 45° with respect to a preset reference plane, which are sequentially arranged on a first branched optical path through which the first signal light is propagated; a second polarizer letting through only a polarization component which is inclined by 45° with respect to the reference plane, which is arranged on a second branched optical path through which the second signal light is propagated; and a third polarizer letting through only a polarization component which is parallel or perpendicular with respect to the reference plane, which is arranged on a third branched optical path through which the third signal light is propagated, and the plurality of light receiving elements include: a first light receiving element receiving the first signal light passed through the quarter wave plate and the first polarizer; a second light receiving element receiving the second signal light passed through the second polarizer; a third light receiving element receiving the third signal light passed through the third polarizer; and a fourth light receiving element receiving the fourth signal light branched by the optical branching section to be propagated through a fourth branched optical path, and a light emission plane of the quarter wave plate and a light incident plane of the first polarizer, a light emission plane of the first polarizer and a light incident plane of the first light receiving element, a light emission plane of the second polarizer and a light incident plane of the second light receiving element, and a light emission plane of the third polarizer and a light incident plane of the third light receiving element, are each arranged to be inclined to each other so as not to be substantially in parallel.

Furthermore, the configuration may be such that the optical branching section includes: a first stage optical coupler branching an input signal light into a reflected light and a transmitted light at a branching ratio of 1:3; a second stage optical coupler branching the transmitted light from the first stage optical coupler into a reflected light and a transmitted light at a branching ratio of 1:2; and a third stage optical coupler branching the transmitted light from the second stage optical coupler into a reflected light and a transmitted light at a branching ratio of 1:1, and an incident angle of each of the signal lights given to the first to third stage optical couplers is set to be a predetermined angle away from the Brewster angle.

According to such a configuration, by using optical couplers in a three stage configuration as the optical branching section, and setting the incident angle of each of the signal lights given to the optical couplers, to the predetermined angle away from the Brewster angle, it becomes possible to reduce the phase shift which occurs between p/s waves of the branched light in each optical coupler, so that the higher measurement accuracy can be realized.

In addition, the above polarization measuring apparatus is preferably configured such that the reflected light of the first stage optical coupler is propagated through the fourth branched optical path, the reflected light of the second stage optical coupler is propagated through one of the second branched optical path and the third branched optical path, the reflected light of the third stage optical coupler is propagated through the first branched optical path, and the transmitted light of the third stage optical coupler is propagated through the other of the second branched optical path and the third branched optical path.

In this way, by appropriately setting the branched optical paths for propagating therethrough the signal lights branched by the optical couplers in the three stage configuration, taking into consideration differences in the respective optical path lengths, it becomes possible to minimize a mounted area of the optical parts.

Moreover, as a specific configuration of the above described polarization measuring apparatus, the optical branching section, the plurality of optical elements, and the plurality of light receiving elements may be mounted on the same substrate, and also there may be provided a temperature control section that controls the temperature of the substrate to be constant.

According to such a configuration, by mounting the optical parts on the same substrate and controlling the temperature of the substrate, the temperatures of the respective optical parts on the substrate become constant. Therefore, a change in optical characteristic, optical axis shift and the like due to the temperature fluctuation, can be suppressed. Thus, it becomes possible to measure the polarization of input signal light with even higher accuracy.

Other objects, features and advantages of the present invention will become apparent from the following description of embodiments, in conjunction with the appended drawings.

DETAILED DESCRIPTION OF THE INVENTION

Figure 1:
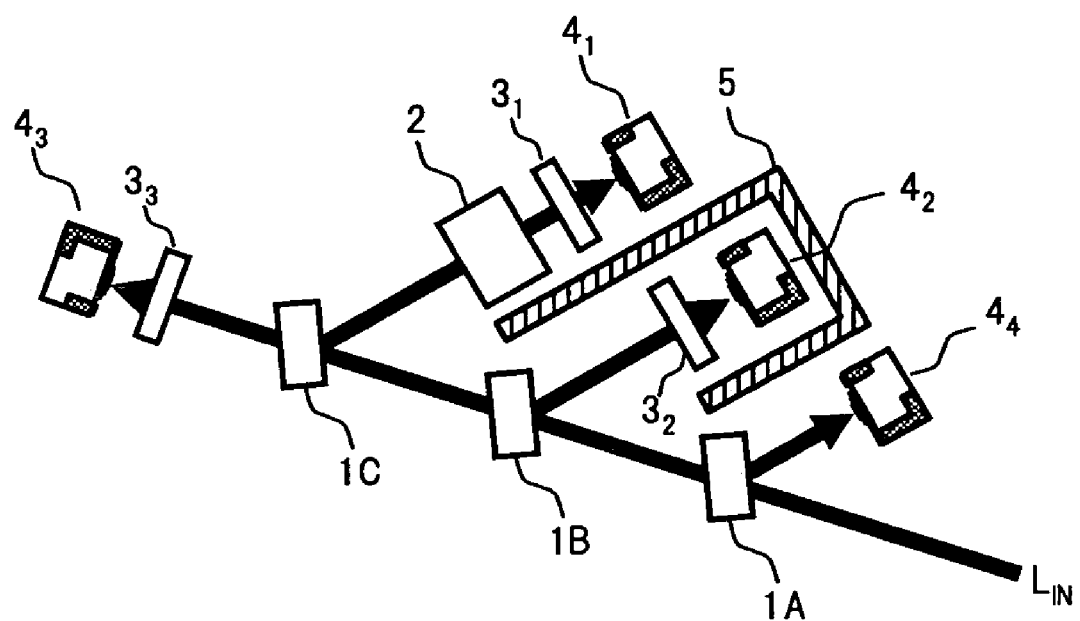
FIG. 1 is a plan view showing a configuration of an optical system of a polarization measuring apparatus according to one embodiment of the present invention.

Hereunder is a description of the best mode for realizing a polarization measuring apparatus of the present invention, with reference to appended drawings. Throughout the drawings, the same reference numerals denote the same or corresponding parts.

FIG. 1 is a plan view showing a configuration of an optical system of a polarizabon measuring apparatus according to one embodiment of the present invention.

Figure 7:
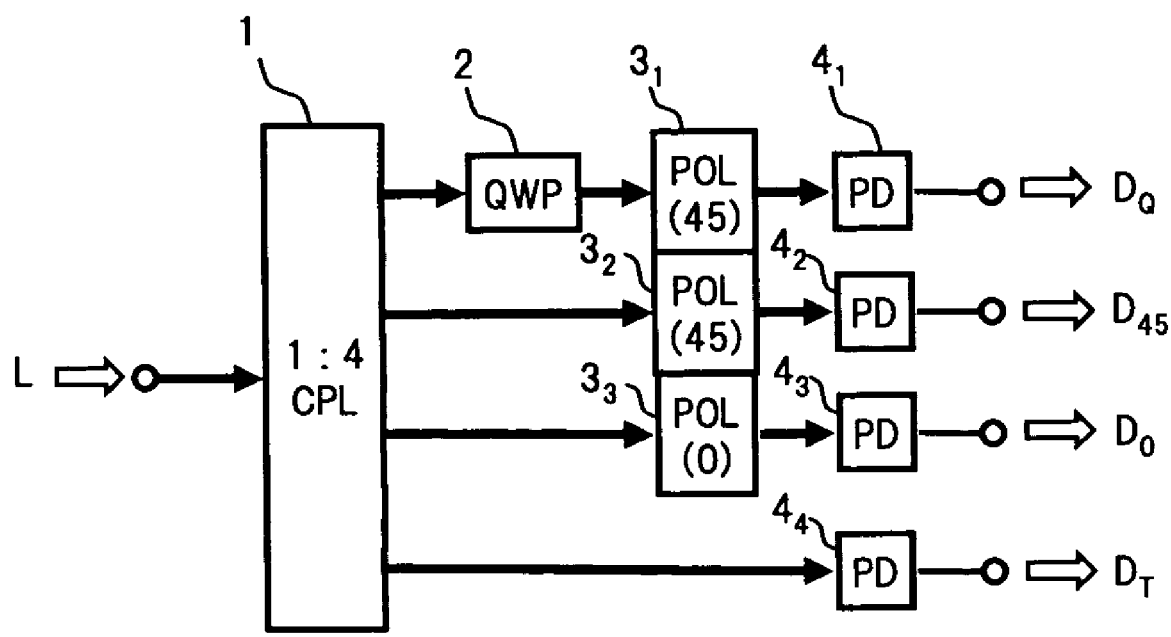
FIG. 7 is a diagram showing a configuration of a basic optical system of a conventional polarization measuring apparatus.

In FIG. 1, the present polarization measuring apparatus is provided with three optical couplers 1A, 1B and 1C each obtained by forming, for example, a dielectric multi-layer film on a plate, as a specific configuration corresponding to the optical coupler 1 in the above described conventional basic optical system shown in FIG. 7. The optical couplers 1A to 1C are in a three stage configuration where an input signal light $L_{IN}$ is incident on the optical coupler 1A of a first stage, a transmitted light of the optical coupler 1A is incident on the optical coupler 1B of a second stage, and a transmitted light of the optical coupler 1B is incident on the optical coupler 1C of a third stage. Branching ratios of the incident lights at the respective optical couplers 1A to 1C (reflected light power : transmitted light power) are set to be 1:3 for the first stage, 1:2 for the second stage, and 1:1 for the third stage. As a result, the input signal light $L_{IN}$ is branched into a reflected light of the optical coupler 1A, a reflected light of the optical coupler 1B, and a reflected light and a transmitted light of the optical coupler 1C, at the same power respectively. Moreover, a light incident plane of each of the optical couplers 1A to 1C is inclined with respect to a propagation direction of the input signal light $L_{IN}$ so that an incident angle of signal light is away from the Brewster angle. Here, the incident angles of the respective optical couplers 1A to 1C are respectively set to be 22.5°, taking into consideration the most effective arrangement in order to miniaturize the whole apparatus as described later. However, this does not mean that the incident angles of the respective optical couplers 1A to 1C are limited to the above value.

The branched light reflected by the optical coupler 1A, is here incident directly on a light receiving element $4_4$. Moreover, the branched light reflected by the optical coupler 1B passes through a polarizer $3_2$ letting through only a polarization component inclined by 45° with respect to a preset reference plane, to be incident on a light receiving element $4_2$. As the above reference plane, for example, it is possible to set an arbitrary plane such as a bottom face of a package of the present apparatus as described later. The polarizer $3_2$ is arranged to be inclined by a predetermined angle with respect to the light receiving surface of the light receiving element $4_2$ so as not to form an interference system by its light emission plane and the light receiving surface of the light receiving element $4_2$.

The branched light reflected by the optical coupler 1C passes through a quarter wave plate 2 and a polarizer $3_1$ letting through only a polarization component inclined at 45° with respect to the abovementioned reference plane, to be incident on a light receiving element $4_1$. Moreover, the branched light which has passed through the optical coupler 1C, passes through a polarizer $3_3$ letting through only a polarization component parallel (or perpendicular) with respect to the abovementioned reference plane, to be incident on a light receiving element $4_3$. Similarly to the abovementioned polarizer $3_2$, the polarizers $3_1$ and $3_3$ are each arranged to be inclined by a predetermined angle with respect to the light receiving surfaces of the light receiving elements $4_1$ and $4_3$ so as not to form interference systems by their respective light emission planes and the respective light receiving surfaces of the light receiving elements $4_1$ and $4_3$. Moreover, the quarter wave plate 2 is also arranged to be inclined by a predetermined angle with respect to the light incident plane of the polarizer $3_1$ so as not to form an interference system by its light emission plane and the light incident plane of the polarizer $3_1$.

Furthermore, the present polarization measuring apparatus is provided with a shielding wall 5 blocking a stray light generated between optical elements adjacent to each other arranged on each of branched optical paths $P_4$, $P_2$ and $P_1$ through which the branched lights reflected by the respective optical couplers 1A, 1B and 1C are propagated, from being propagated toward the light receiving element on another branched optical path, which is different from the branched optical path concerned. Here, for example, a member having an approximately C-shaped cross-section which is laid along both sides of the branched optical path $P_2$ corresponding to the reflected light of the optical coupler 1B, is used for this shielding wall 5. However, the shape of the shielding wall 5 is not limited to the above example, and this can be suitably designed taking into consideration a propagation direction of the stray light as described later.

Electric signals $D_Q$, $D_{45}$, $D_0$ and $D_T$ indicating the powers of the signal lights received by the respective light receiving elements $4_1$ to $4_4$, are sent to a calculating section (not shown here) connected to the outside via a lead wire or the like of the package which accommodates an optical system as described later, and the Stokes parameters $S_0$ to $S_3$ and DOP are calculated in accordance with the abovementioned relationships of equation (1) and equation (2) in the calculating section.

Figure 2:
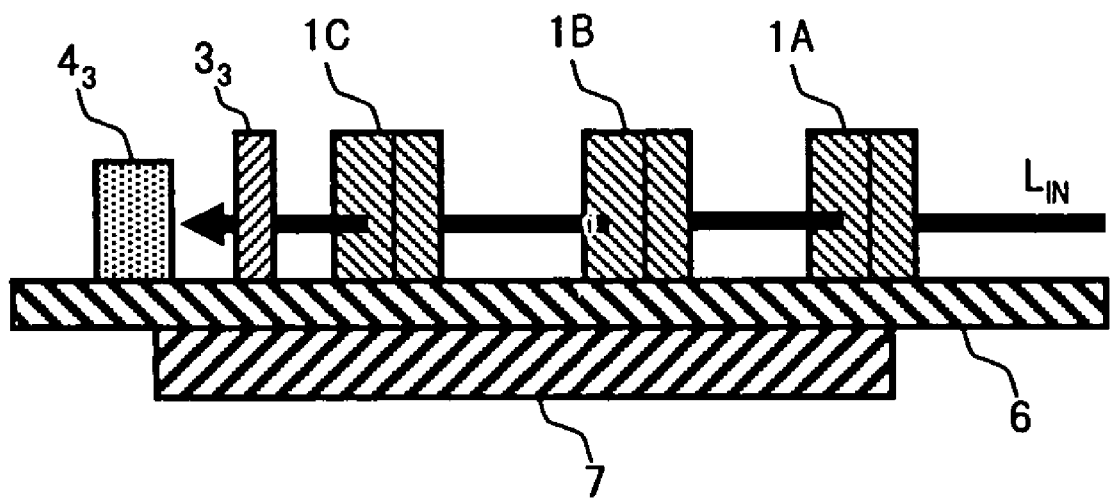
FIG. 2 is a cross-sectional view along an optical axis of input signal light in the optical system in FIG. 1.

In addition, for example as shown in the cross-sectional view along an optical axis of the input signal light $L_{IN}$ in FIG. 2, the present polarization measuring apparatus comprises; a single substrate 6 on an upper surface of which are arranged the abovementioned respective optical elements (the optical couplers 1A to 1C, the quarter wave plate 2, the polarizers $3_1$ to $3_3$, light receiving elements $4_1$ to $4_4$, and the shielding wall 5 ); and a Peltier 7 which is provided in contact with a bottom surface of the substrate 6. A material such as metal having a coefficient of linear expansion as close as possible to a coefficient of linear expansion of each of the arranged optical elements, is used for the substrate 6. The Peltier 7 controls the temperature of the substrate 6 so that the temperature of each optical element arranged on the same substrate 6 is not changed. The temperature of the substrate 6 controlled by the Peltier 7 may have differences depending on the location, and the temperature control is performed by the Peltier 7 so that the temperature distribution is not changed.

Next is a description of an operation of the polarization measuring apparatus having the above configuration.

Figure 4:
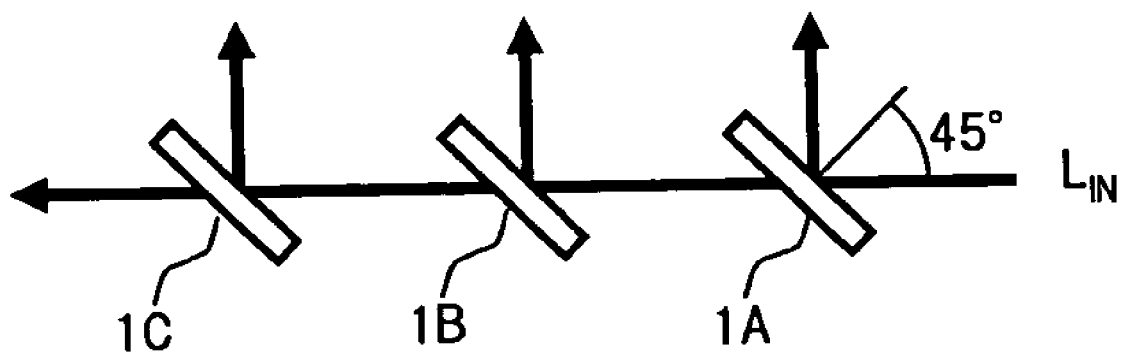
FIG. 4 is a diagram showing an arrangement of optical elements adjacent to each other on the same branched optical path in the above embodiment.
Figure 4:
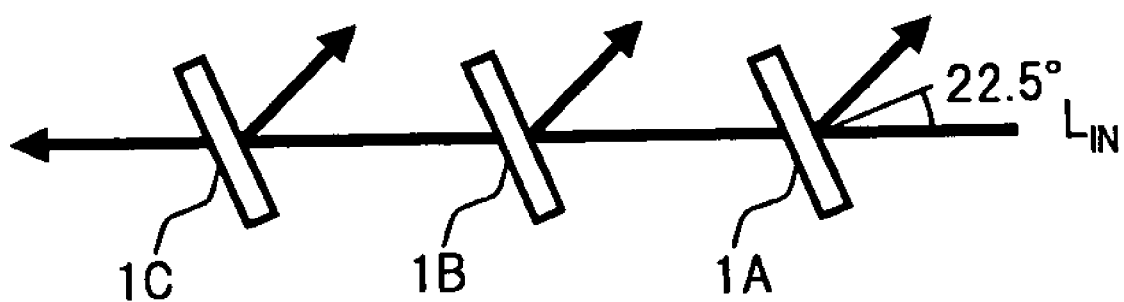

In the present polarization measuring apparatus, the input signal light $L_{IN}$ the polarization of which is to be measured, is sequentially incident on the optical couplers 1A to 1C in the three stage configuration, and is thus branched into four signal lights having mutually equal powers. At this time, the signal light is given at the incident angle of 22.5° with respect to the light incident plane of each of the optical couplers 1A to 1C, so that the phase shift occurred between the p/s waves of each of the transmitted light and the reflected light, is reduced. To be specific, generally, in the case where the signal light is branched using an optical coupler which utilizes a dielectric multi-layer film, then in many cases, from the point of ease of arrangement, the arrangement of the optical coupler is designed so that the reflected light is emitted in a direction of 90° with respect to the incident light as shown in (A) of FIG. 4. Compared to this arrangement of the optical coupler where the signal light is given at the incident angle of 45°, by adopting the arrangement of the optical coupler where the signal light is given at the incident angle of 22.5° away from the Brewster angle as shown in (B) of FIG. 4, the phase shift occurred between the p/s waves of the signal light branched by the optical coupler can be reduced to about ⅓ times.

The three signal lights reflected in a direction at 45° with respect to an incident direction of the input signal light $L_{IN}$ by the optical couplers 1A to 1C in the three stage configuration, and the signal light passed through the optical coupler 1C, are respectively propagated through any one of the first branched optical path $P_1$ where the quarter wave plate 2, the polarizer $3_1$ and the light receiving element $4_1$ are arranged, the second branched optical path $P_2$ where the polarizer $3_2$ and the light receiving element $4_2$ are arranged, the third branched optical path $P_3$ where the polarizer $3_3$ and the light receiving element $4_3$ are arranged, and the fourth branched optical path $P_4$ where the polarizer $4_4$ is arranged, in order to obtain the four Stokes parameters $S_0$ to $S_3$ represented by the relationship of the abovementioned equation (1). For the first to fourth branched optical paths $P_1$ to $P_4$, the number of optical elements through which the signal light passes from when it is branched by the optical coupler until it is received by the light receiving element is two in the first branched optical path $P_1$, one in the second and third branched optical paths $P_2$ and $P_3$, and zero in the fourth branched optical path $P_4$. Therefore, there occur differences in the necessary optical path lengths for the respective branched optical paths. Consequently, the mounting area of the present apparatus differs depending on which of the first to fourth branched optical paths $P_1$ to $P_4$, the four signal lights branched by the optical couplers 1A to 1C are sent to. Therefore, in the present embodiment, in order to realize the minimum mounting area, taking into consideration the above differences in the optical path lengths, the reflected light of the first stage optical coupler 1A is sent to the fourth branched optical path $P_4$, the reflected light of the second stage optical coupler 1B is sent to the second branched optical path $P_2$, the reflected light of the third stage optical coupler 1C is sent to the first branched optical path $P_1$, and the transmitted light of the third stage optical coupler 1C is sent to the third branched optical path $P_3$. Since the optical path length of the second branched optical path $P_2$ and the optical path length of the third branched optical path $P_3$ become equivalent, the reflected light of the second stage optical coupler 1B may be sent to the third branched optical path $P_3$, and the transmitted light of the third stage optical coupler 1C may be sent to the second branched optical path $P_2$. The abovementioned arrangement of the optical system is here described as a '0121' type in which the number of optical elements passing through is sequentially represented from the input side. As another arrangement of the optical system capable of realizing a small mounting area, a '0112' type is also useful, although here omitted from the drawing.

Figure 3:
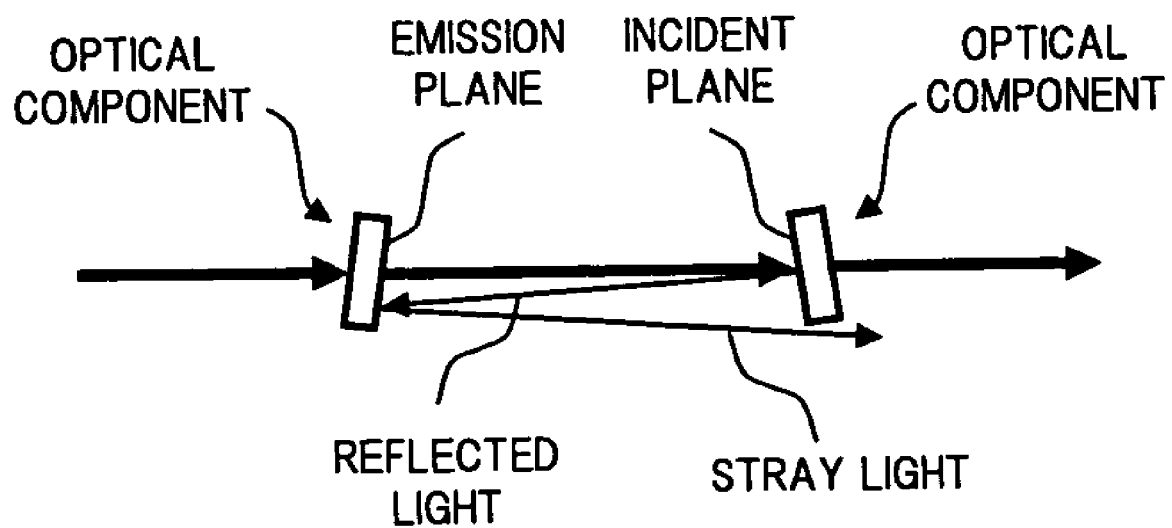
FIG. 3 is a diagram for explaining an arrangement of optical couplers in the above embodiment.
Figure 8:
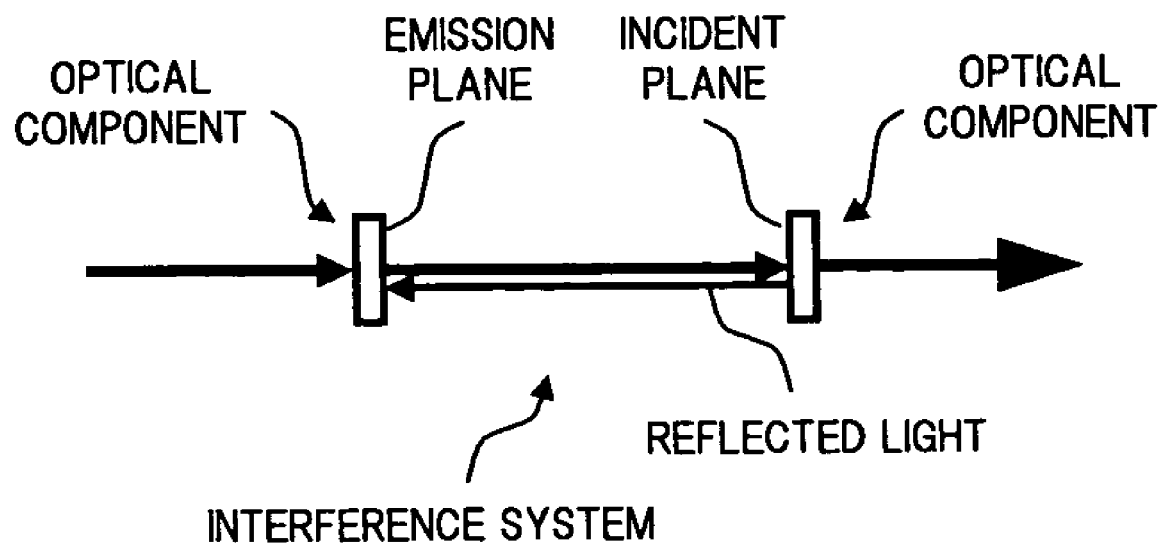
FIG. 8 is a diagram for explaining a situation where an interference system is formed between optical elements adjacent to each other in the conventional polarization measuring apparatus.

Since a part of the signal light propagated through each of the first to fourth branched optical paths $P_1$ to $P_4$, is reflected when it is incident on the optical element arranged on each of the optical paths, then if a reflecting plane thereof is in parallel or close to parallel with respect to the light emission plane of the optical element on a former stage, an interference system is formed to cause the multi-reflection as shown in FIG. 8 described above. Specifically, locations where the interference system is possibly formed in the arrangement of the optical system shown in FIG. 1, are between the quarter wave plate 2 and the polarizer $3_1$, and between the polarizer $3_1$ and the light receiving element $4_1$ on the first branched optical path $P_1$, between the polarizer $3_2$ and the light receiving element $4_2$ on the second branched optical path $P_2$, and between the polarizer $3_3$ and the light receiving element $4_3$ on the third branched optical path $P_3$. Therefore, in the present embodiment, for the abovementioned respective locations, as shown in FIG. 3, the respective optical elements are arranged so that the light emission plane of the optical element on the former stage becomes a state inclined with respect to the light incident plane of the optical element on a latter stage (an approximately inverted V-shape). It is desirable to design inclination angles of the opposing light incident and emission planes so as not to generate the substantial multi-reflection, taking into consideration characteristics of the respective optical elements and beam diameters of the signal lights passing therethrough. By having such an approximate inverted V-shape arrangement, it becomes possible to avoid the formation of interference system. However, as shown in FIG. 3, there is a possibility that the reflected light becomes a stray light to be incident on the light receiving element on another branched optical path. Therefore, here the shielding wall 5 is provided in order to prevent the propagation of stray light as mentioned above.

Figure 5:
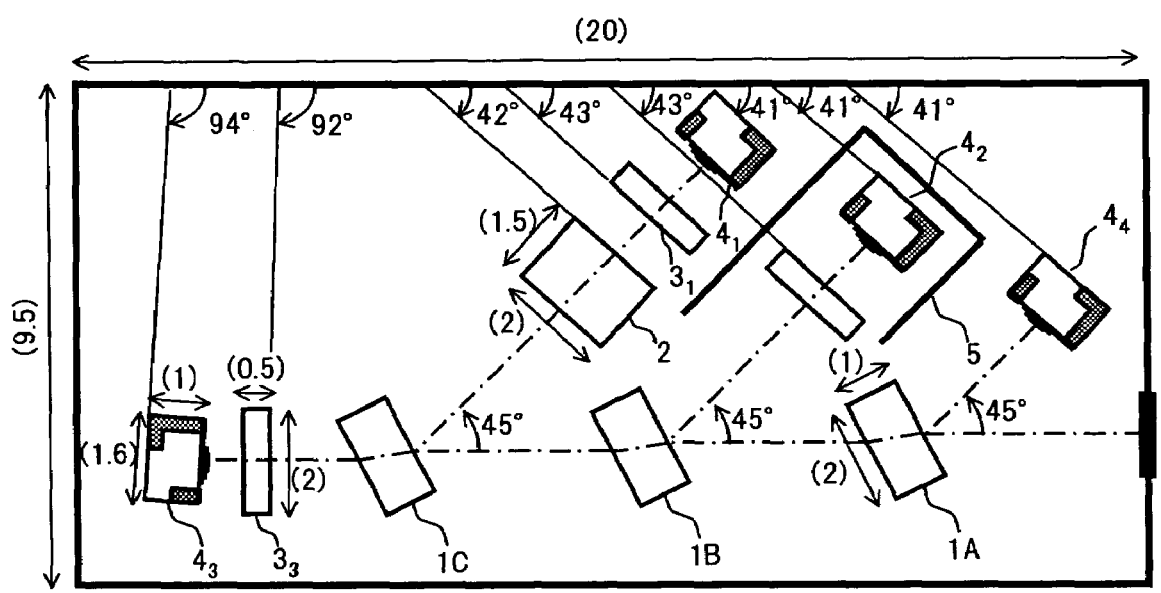
FIG. 5 is a plan view showing a specific arrangement example of optical elements in the above embodiment.

FIG. 5 is a plan view showing a specific arrangement example of the respective optical elements taking into consideration the formation of interference system and the propagation of stray light as mentioned above. However, the arrangement of the optical system in the present invention is not limited to this example.

In the arrangement example of FIG. 5, assuming that one side face (the top side plane in FIG. 5) of the package in which the respective optical elements of the present apparatus are accommodated, is a reference plane of arrangement angle, the input signal light $L_{IN}$ is incident in parallel on the reference plane. The light receiving surfaces of the respective light receiving elements $4_1$, $4_2$, and $4_4$ which receive the branched lights reflected in a direction of 45° by the respective optical couplers 1A to 1C, are inclined by 41° with respect to the reference plane, and the light receiving surface of the light receiving element $4_3$ which receives the branched light transmitted over the optical coupler 1C, is inclined by 94° with respect to the reference plane.

Moreover, the light incident and emission planes of the quarter wave plate 2 located on the first branched optical path $P_1$ are inclined by 42° with respect to the reference plane, and the light incident and emission planes of the polarizer $3_1$ are inclined by 43° with respect to the reference plane. Therefore, the light incident and emission planes between the quarter wave plate 2, and the polarizer $3_1$ and the light incident and emission planes between the polarizer $3_1$ and the light receiving element $4_1$, become nonparallel and attain the state as shown in FIG. 3. The stray light generated between the polarizer $3_1$ and the light receiving element $4_1$, is propagated to the second branched optical path $P_2$ side. However, the stray light is blocked by the shielding wall 5 located between the first and second branched optical paths $P_1$ and $P_2$ and is not received by the light receiving element $4_2$. The stray light generated between the quarter wave plate 2 and the polarizer $3_1$ is propagated to the opposite side to second branched optical path $P_2$ side. However, since a light receiving element of another branched optical path does not exist in this direction, a shielding wall for blocking the stray light is not specially provided. However, in the case where it is necessary to consider the reflection of stray light at the package side face, a shielding wall may be provided in the vicinity of the quarter wave plate 2 and the polarizer $3_1$ in order to block the propagation of stray light.

Furthermore, the light incident and emission planes of the polarizer $3_2$ located on the second branched optical path $P_2$ are also inclined by 43° with respect to the reference plane. Therefore, the respective light incident and emission planes between the polarizer $3_2$ and the light receiving element $4_2$ become nonparallel and attain the state as shown in FIG. 3. The stray light generated between the polarizer $3_2$ and the light receiving element $4_2$ is propagated to the fourth branched optical path $P_4$ side. However, the stray light is blocked by the shielding wall 5 located between the second and fourth branched optical paths $P_2$ and $P_4$ and is not received by the light receiving element $4_4$. In addition, the light incident and emission planes of the polarizer $3_3$ located on the third branched optical path $P_3$ are inclined by 92° with respect to the reference plane. Therefore, the respective light incident and emission planes between the polarizer $3_3$ and the light receiving element $4_3$ become nonparallel and attain the state as shown in FIG. 3.

When the respective optical elements are actually arranged on the above locations, it is preferable to verify the location accuracy utilizing a technique such as image processing. By performing such verification, it becomes possible to reduce the deterioration of measurement accuracy due to manufacturing errors.

The numerical values in brackets shown in the abovementioned FIG. 5 denote the dimensions of the respective optical elements. The dimensions of the respective optical elements used in the present embodiment are exemplified as width× height×depth (mm), in which each of the optical couplers 1A to 1C is 2×2×1, the quarter wave plate 2 is 2×2×1.5, each of the polarizers $3_1$ to $3_3$ is 2×2×0.5, and each of the light receiving elements $4_1$ to $4_3$ is 1.6×2.55×1. By applying the respective optical elements of the abovementioned dimensions and the '0121' type optical system as above described, it becomes possible to accommodate the optical system inside a package with internal dimensions of width×height of 9.5×20 (mm) for example.

Figure 6:
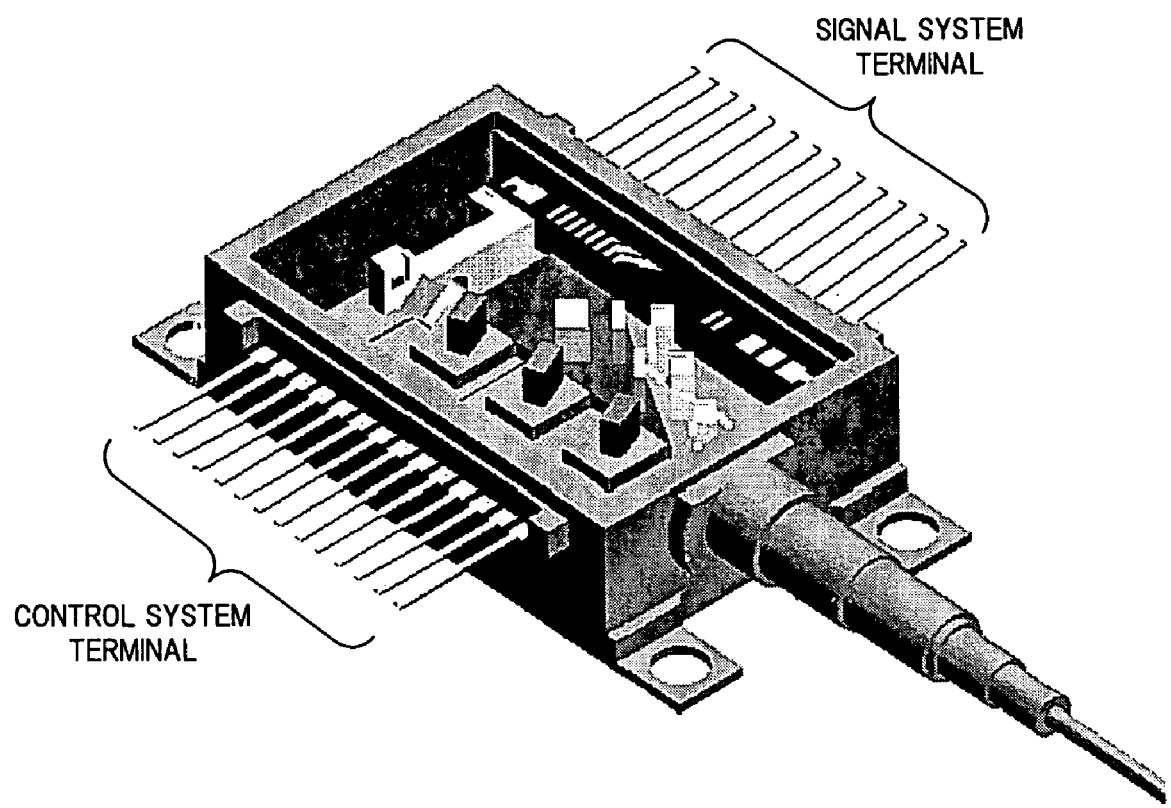
FIG. 6 is a diagram exemplarily showing an appearance of the polarization measuring apparatus in the above embodiment.

FIG. 6 is a diagram showing an external appearance of the polarization measuring apparatus accommodated in the package as mentioned above. Here, a cap on the package top face is omitted in order to show the appearance inside the package. In this manner, it is possible to use a greatly miniaturized butterfly-type general-purpose package for the present polarization measuring apparatus. Moreover, here it becomes difficult for noise to enter into the monitor signals $D_Q$, $D_{45}$, $D_0$, and $D_T$, by taking out the signals $D_Q$, $D_{45}$, $D_0$, and $D_T$ output from the respective light receiving elements $4_1$ to $4_4$, from lead terminals located on one side of the package, and by collecting together control system terminals which carry a large current, such as temperature control terminals of the Peltier 7, at lead terminals located on the other side of the package,. By performing such mounting, the Stokes parameters $S_0$ to $S_3$ and the DOP can be measured with higher accuracy. In addition to this, although not specifically shown in the figure here, if circuits connected up to the respective light receiving elements 41 to 44 inside the package are arranged as far apart from the other circuits as possible, it becomes possible to reduce an influence of noise more effectively.

According to the polarizaton measuring apparatus of the present embodiment as described above, the optical elements adjacent to each other on the same branched optical path are arranged to be inclined to each other, to avoid the formation of interference system, and the stray light generated between the optical elements arranged to be inclined is blocked by the shielding wall 5 to be prevented from reaching the optical elements on another branched optical path, so that the signal light powers can be accurately and stably detected in the respective optical elements $4_1$ to $4_4$. Therefore, it becomes possible to measure the Stokes parameters and the DOP with extremely high accuracy. Moreover, the incident angle of the signal light to each of the optical couplers 1A to 1C in the three stage configuration is away from the Brewster angle, so that the phase shift occurred between the p/s waves of the branched light is reduced. Therefore, it becomes possible to measure the polarizaton of the input signal light with higher accuracy. Furthermore, by making the arrangement of the optical system as the '0121' type or the '0112' type, the entire apparatus can be miniaturized. In addition, the respective optical elements constituting the above optical system are arranged on the same substrate 6, and the temperature of the substrate 6 is controlled by the Peltier 7. Therefore, it becomes possible to reduce the deterioration of measurement accuracy due to the temperature fluctuation. Moreover, the signal system terminals and the control system terminals are arranged separately with lead terminals on opposite sides of the package, so that there is less likelihood of influence of noise. Therefore, it becomes possible to measure the polarization of the input signal light with even higher accuracy. Such a miniaturized polarization measuring apparatus having superior measurement accuracy is useful in enhancing the high performance and miniaturization of various measuring devices which are required to detect the polarization of signal light accurately at high speed, such as, a monitoring section used to determine a compensation amount in a PMDC (polarization mode dispersion compensator), for example.

In the above embodiment, the description has been made such that in the first to fourth branched optical paths $P_1$ to $P_4$, there occur differences in the necessary optical path lengths corresponding to the number of arranged optical elements. However, in the case where the deterioration of measurement accuracy due to the differences in the optical path lengths becomes a problem, it is desirable to improve the configuration of the optical system in order to temporally match the phases on the respective branched optical paths. Specifically, for example, in order to match with the optical path length of the first branched path $P_1$ which needs the longest optical path length, the light receiving elements $4_2$ to $4_4$ on the other branched optical paths $P_2$ to $P_4$ may be arranged apart, or delay elements such as birefringent crystal may be inserted in the respective branched optical paths $P_1$ to $P_4$ to equalize the respective effective optical path lengths.

Moreover, the description has been made such that the respective Stokes parameters $S_0$ to $S_3$ are calculated in accordance with the relationship of equation (1) using the signals $D_Q$, $D_{45}$, $D_0$, and $D_T$ detected by the respective light receiving elements $4_1$ to $4_4$. However, a determinant for correcting variations of the characteristics or arrangements of the respective optical elements may be obtained in advance, and the respective Stokes parameters $S_O$ to $S_3$ then calculated using the determinant and the values of the actually measured signals $D_0$, $D_{45}$, $D_0$, and $D_T$. By performing such correction processing, it becomes possible to effectively reduce the deterioration of measurement accuracy due to manufacturing errors or the like.

What is claimed is:

1. A polarization measuring apparatus comprising:
an optical branching section that branches an input signal light into a plurality of signal lights;
a plurality of optical elements arranged on a plurality of branched optical paths through which the signal lights branched by said optical branching section are propagated, respectively, for providing the signal lights with polarizations and phase shifts, which are different for each signal light; and
a plurality of light receiving elements receiving the signal lights respectively propagated through said branched optical paths, to detect the powers of the signal lights,
wherein, the elements adjacent to each other of said optical elements and said light receiving element arranged on the same branched optical path, are arranged to be inclined to each other so that a light emission plane of the element positioned on a former stage and a light incident plane of the element located on a latter stage are not substantially in parallel, so as to not generate substantial multi-reflection between adjacent elements, and
there is provided a shielding section that prevents a stray light generated by the reflection of the signal light between the elements where said light incident and emission planes are arranged to be inclined to each other, from reaching said light receiving element located on another branched optical paths which is different from the branched optical path concerned.

2. A polarization measuring apparatus according to claim 1,
wherein said optical branching section branches the input signal light into first to fourth signal lights;
said plurality of optical elements include: a quarter wave plate and a first polarizer letting through only a polarization component which is inclined by 45° with respect to a preset reference plane, which are sequentially arranged on a first branched optical path through which the first signal light is propagated; a second polarizer letting through only a polarization component which is inclined by 45° with respect to the reference plane, which is arranged on a second branched optical path through which the second signal light is propagated; and a third polarizer letting through only a polarization component which is parallel or perpendicular with respect to the reference plane, which is arranged on a third branched optical path through which the third signal light is propagated; and
said plurality of light receiving elements include: a first light receiving element receiving the first signal light passed through said quarter wave plate and said first polarizer; a second light receiving element receiving the second signal light passed through said second polarizer; a third light receiving element receiving the third signal light passed through said third polarizer; and a fourth light receiving element receiving the fourth signal light branched by said optical branching section to be propagated through a fourth branched optical path, and
a light emission plane of said quarter wave plate and a light incident plane of said first polarizer, a light emission plane of said first polarizer and a light incident plane of said first light receiving element, a light emission plane of said second polarizer and a light incident plane of said second light receiving element, and a light emission plane of said third polarizer and a light incident plane of said third light receiving element, are each arranged to be inclined to each other so as not to be substantially in parallel.

3. A polarization measuring apparatus according to claim 1,
wherein said optical branching section, said plurality of optical elements, and said plurality of light receiving elements are mounted on the same substrate, and also there is provided a temperature control section that controls the temperature of said substrate to be constant.

4. A polarization measuring apparatus according to claim 1, wherein there is provided a calculating section that calculates the Stoke parameters based on the signal light power detected by each of said light receiving elements, to obtain information related to the polarization of the input signal light.

5. A polarization measuring apparatus according to claim 1, wherein output terminals of said light receiving elements are provided on one end, and other output terminals are provided on the other end.

6. A polarization measuring apparatus according to claim 2, wherein said optical branching section includes: a first stage optical coupler branching the input signal light into a reflected light and a transmitted light at a branching ratio of 1:3; a second stage optical coupler branching the transmitted light from said first stage optical coupler into a reflected light and a transmitted light at a branching ratio of 1:2; and a third stage optical coupler branching the transmitted light from said second stage optical coupler into a reflected light and a transmitted light at a branching ratio of 1:1, and an incident angle of each of the signal lights given to said first to third stage optical couplers is set to be a predetermined angle away from the Brewster angle.

7. A polarization measuring apparatus according to claim 2, wherein said first to fourth branched optical paths each have substantially the same optical path length.

8. A polarization measuring apparatus according to claim 6, wherein said predetermined angle away from the Brewster angle is 22.5°.

9. A polarization measuring apparatus according to claim 6, wherein the reflected light of said first stage optical coupler is propagated through said fourth branched optical path, the reflected light of said second stage optical coupler is propagated through one of said second branched optical path and said third branched optical path, the reflected light of said third stage optical coupler is propagated through said first branched optical path, and the transmitted light of said third stage optical coupler is propagated through the other of said second branched optical path and said third branched optical path.

10. A polarization measuring apparatus according to claim 6, wherein the reflected light of said first stage optical coupler is propagated through said fourth branched optical path, the reflected light of said second stage optical coupler is propagated through one of said second branched optical path and said third branched optical path, the reflected light of said third stage optical coupler is propagated through the other of said second branched optical path and said third branched optical path, and the transmitted light of said third stage optical coupler is propagated through said first branched optical path.

11. A polarization measuring apparatus according to claim 6, wherein said shielding section comprises a shielding wall including at least; a first portion arranged between the branched optical path through which the reflected light of said first stage optical coupler is propagated and the branched optical path through which the reflected light of said second stage optical coupler is propagated, and extending from the vicinity of the light receiving element receiving the reflected light of said first stage optical coupler, to the vicinity of the element, the light incident and emission planes of which are arranged to be inclined to each other, on the branched optical path through which the reflected light of said second stage optical coupler is propagated, and a second portion arranged between the branched optical path through which the reflected light of said second stage optical coupler is propagated and the branched optical path through which the reflected light of said third stage optical coupler is propagated, and extending from the vicinity of the light receiving element receiving the reflected light of said second stage optical coupler, to the vicinity of the element, the light incident and emission planes of which are arranged to be inclined to each other, on the branched optical path through which the reflected light of said third stage optical coupler is propagated.

12. A polarization measuring apparatus according to claim 3, wherein signal paths transmitting signals output from said plurality of light receiving elements are arranged away from a signal path supplying a drive signal for said temperature control section.

13. An apparatus comprising:
at least one coupler branching an input light into a plurality of branched lights traveling along a plurality of propagation paths, respectively;
optical elements positioned along the propagation paths, the optical elements including
    elements positioned along the propagation paths and causing the plurality of branching lights to have different polarizations and phases from each other, and
    a plurality of light receivers receiving the plurality of branched lights, respectively, having the different polarizations and phases from each other; and
a shield preventing stray light reflected between adjacent optical elements positioned along a respective propagation path from reaching a light receiver positioned along a different propagation path, wherein
    adjacent optical elements positioned along each respective propagation path are inclined with respect to each other so that a light emission plane of a first one of the adjacent optical elements through which the branched light on the respective propagation path passes is not substantially parallel to a light incident plane of the other one of the adjacent optical elements, to thereby not generate substantial multi-reflection between adjacent elements, and
    the apparatus measures polarization of the input light in accordance with the branched lights as received by the light receivers.

14. An apparatus comprising:
a first coupler branching an input signal light into a first light and a second light;
a second coupler branching the first light into a third light and a fourth light;
a third coupler branching the third light into a fifth light and a sixth light;
a first light receiving element receiving the second light;
a first polarizer rotating a polarization of the fourth light;
a second light receiving element receiving the polarization rotated fourth light;
a phase shifter shifting a phase of the sixth light;
a second polarizer rotating a polarization of the sixth light;

a third light receiving element receiving the sixth light having the phase shifted by the phase shifter and the polarization rotated by the second polarizer;

a third polarizer rotating a polarization of the fifth light;

a fourth light receiving element receiving the polarization rotated fifth light; and a shield preventing stray light reflected between the first polarizer and the second light receiving element from reaching the first, third and fourth light receiving elements, and preventing stray light reflected between the phase shifter and the second polarizer, and stray light reflected between the second polarizer and the third light receiving element, from reaching the second and first light receiving elements, wherein the first, second and third polarizers and the phase shifter causes the second light as received by the first light receiving element, the fourth light as received by the second light receiving element, the sixth light as received by the third light receiving element and the fifth light as received by the fourth light receiving element to have different polarizations and phases from each other, the first polarizer and the second light receiving element are inclined with respect to each other so that a light emission plane of the first polarizer and a light incident plane of the second light receiving element are not substantially parallel, so as to not generate substantial multi-reflection between the first polarizer and the second light receiving element, the phase shifter and the second polarizer are between the third coupler and the third light receiving element so that the sixth light passes through one of the phase shifter and the second polarizer and thereafter passes through the other of the phase shifter and the second polarizer, and thereafter is received by the third light receiving element, the phase shifter and the second polarizer are inclined with respect to each other so that a light emission plane of said one of the phase shifter and the second polarizer and a light incident plane of said other of the phase shifter and the second polarizer are not substantially parallel, to thereby not generate substantial multi-reflection between the phase shifter and the second polarizer, said other of the phase shifter and the second polarizer and the third light receiving element are inclined with respect to each other so that a light emission plane of said other of the phase shifter and the second polarizer and a light incident plane of the third light receiving element are not substantially parallel, to thereby not generate substantial multi-reflection between said other of the phase shifter and the second polarizer and the third light receiving element, the third polarizer and the fourth light receiving element are inclined with respect to each other so that a light emission plane of the third polarizer and a light incident plane of the fourth light receiving element are not substantially parallel, to thereby not generate substantial multi-reflection between the third polarizer and the fourth light receiving element, and the apparatus measures polarization of the input light in accordance with the second light as received by the first light receiving element, the fourth light as received by the second light receiving element, the sixth light as received by the third light receiving element and the fifth light as received by the fourth light receiving element.

\* \* \* \* \*